(No Model.)
W. J. DAVIS.
FASTENING AND TIGHTENING DEVICE FOR TRUNK STRAPS.
No. 588,268.   Patented Aug. 17, 1897.
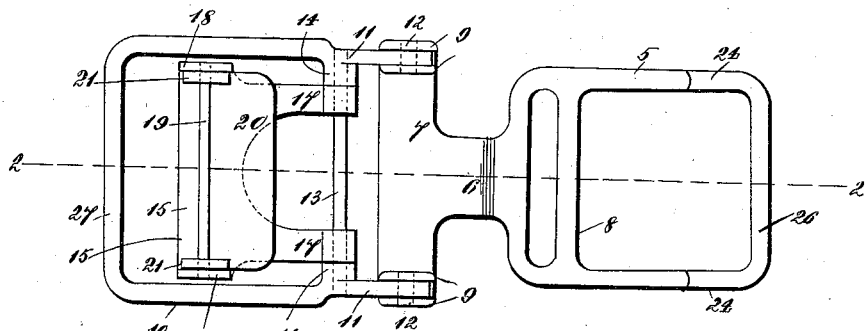
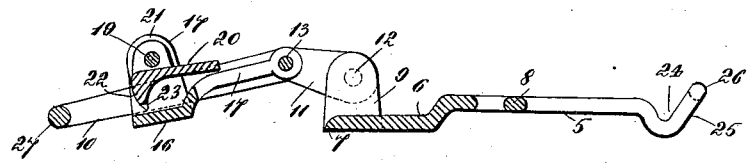
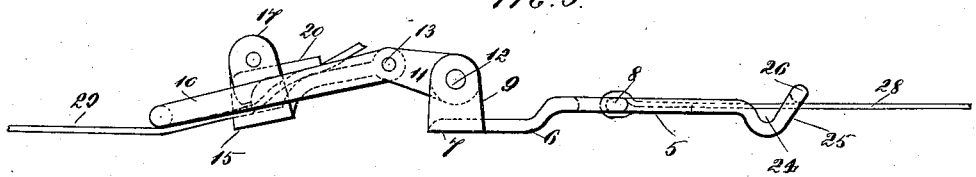
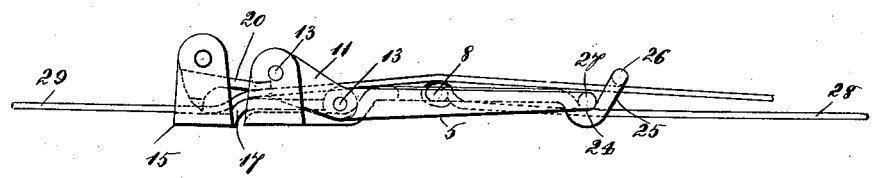
WITNESSES
John Buckler,
C Gerst
INVENTOR
William J. Davis
BY
Edgar Tate & Co.
ATTORNEYS

UNITED STATES PATENT OFFICE.

WILLIAM J. DAVIS, OF NEW YORK, N. Y., ASSIGNOR TO COSMO FARQUHAR AND GEORGE M. DORRANCE, JR., OF SAME PLACE.

FASTENING AND TIGHTENING DEVICE FOR TRUNK-STRAPS.

SPECIFICATION forming part of Letters Patent No. 588,268, dated August 17, 1897.

Application filed October 14, 1896. Serial No. 608,832. (No model.)

*To all whom it may concern:*

Be it known that I, WILLIAM J. DAVIS, a citizen of the United States, residing at New York, in the county of New York and State of New York, have invented certain new and useful Improvements in Fastening and Tightening Devices for Trunk-Straps, of which the following is a full and complete specification, such as will enable those skilled in the art to which it appertains to make and use the same.

This invention relates to straps for trunks and other articles, and particularly to fastening and tightening devices therefor; and the object thereof is to provide an improved device of this class by means of which the ends of a trunk or other strap may be quickly and easily connected and by which the strap when placed upon the trunk or other article and the ends thereof connected may be drawn tight and be secured in position; and with this and other objects in view the invention consists in the device constructed and operating as hereinafter described and claimed.

The present invention is an improvement on that described and claimed in United States Patent No. 560,694, granted to myself and J. Warlick, May 26, 1896, and is fully disclosed in the following specification, of which the accompanying drawings form a part, in which like numerals of reference designate the same parts wherever found throughout the several views, and in which—

Figure 1 is a plan view of my improved strap-fastening device with the separate parts thereof extended; Fig. 2, a central longitudinal section thereof on the line 2 2 of Fig. 1; Fig. 3, a side view of the device as shown in Fig. 1 and showing the ends of a strap connected therewith, and Fig. 4 a side view showing the separate parts of the fastening device folded together in the position they occupy when the ends of the strap have been drawn tight.

In the practice of my invention I provide a main link 5, which is preferably substantially rectangular in form and which is provided at one end with a downwardly and outwardly directed shank 6, to which is secured or on which is formed a cross-head 7, and adjacent to the end of the main link 5 with which the shank 6 is connected is a cross-bar 8.

The cross-head 7 is provided at each end with upwardly-directed shoulders 9, and I also provide a supplemental link 10, which is similar in form to the main link 5, but which is slightly wider than said main link and which is provided at the end thereof adjacent to the main link with downwardly-inclined arms 11, which are pivoted between the upwardly-directed shoulders 9 at the ends of the cross-head 7, as clearly shown at 12.

The cross-bar 13 of the link 10, adjacent to the cross-head 7 of the link 5, is provided at each end with a shoulder or projection 14, and I also provide a clamp 15, which comprises a cross-head 16, provided with arms 17, which are curved upwardly and inwardly and the outer ends of which are mounted on the cross-rod 13 of the supplemental link 10, and the cross-head 16 of the clamp is provided at each end with upwardly-directed shoulders or projections 18, in which is mounted a rod 19, with which is pivotally connected a clamping plate or lever 20, which is provided at its opposite ends with upwardly-directed shoulders or projections 21, through which said rod 19 passes, and the clamping plate or lever 20 is provided at its rear edge with a downwardly-directed extension 22, which is preferably provided on its lower edge with serrations or teeth 23.

Formed in the ends of the sides of the main link 5 opposite the shank 6 are deep notches or recesses 24, and the said sides are carried upwardly and outwardly, as shown at 25, and the cross-bar 26 of the outer end of said link is much higher than the horizontal plane of the body portion of the link, as clearly shown in Fig. 2, and when the supplemental link is folded over the main link, as shown in Fig. 4, the outer cross-bar 27 of said supplemental link will rest in the notches or recesses 24, as shown in Fig. 4.

The clamp 15 is free to swing in the supplemental link 10, and in Fig. 3 I have shown at 28 the ends of a trunk or other strap connected with my improved fastening device, and the operation will be readily understood from the foregoing description, when taken in connection with the accompanying drawings and the following statement thereof.

In practice one end of the strap 28 is secured to the cross-rod 8 of the main link 5, as clearly shown in Fig. 3, and the other end 29, after being passed around the trunk or other article, is passed under the cross-rod 27 of the supplemental link 10 and beneath the clamping plate or lever 20, as is also clearly shown in said figure, said supplemental link being extended, and the clamping plate or lever 20 is turned downwardly, so as to securely hold said end of the strap, and said strap is pulled taut by hand, after which the supplemental link 10 is folded over into the position shown in Fig. 4, and in this operation, as will be understood, the strap is drawn tight, and the body portion of the main link 5 passes within the sides of the supplemental link, and the cross-bar 27 of the supplemental link rests in the notches or recesses 24, and the free end of the strap, or the end which is passed through the clamp, is passed through the opening between the cross-bar 26 of the main link and the cross-bar 27 of the supplemental link, as is also clearly shown in said Fig. 4, and by means of this arrangement the supplemental link is securely held in place and the accidental tripping thereof and the consequent loosening of the strap is avoided.

This device is simple in construction and operation and is perfectly adapted to accomplish the result for which it is intended, and is also comparatively inexpensive, and the main difference between the construction herein shown and described and that of the patent hereinbefore referred to consists in the employment of the supplemental link 10 instead of the lever shown in the patent and in the means for locking said supplemental link and said main link together, so as to prevent the tripping of said supplemental link and the consequent loosening of the strap.

It is evident that changes in and modifications of the construction herein shown and described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. In a fastening and tightening device for trunk-straps, the combination with a main link, one end of which is provided with a cross-head which is formed thereon or secured thereto, and which projects therefrom, of a supplemental link which is wider than the main link, and provided at one end with projecting arms which are pivoted to said cross-head, said supplemental link being also provided with a clamp which is pivoted to the cross-bar thereof, adjacent to said projecting arms and which is adapted to turn in said supplemental link, and through which one end of the strap is adapted to be passed, said supplemental link being adapted to be folded over the main link, and to be secured in position by the free end of the strap, and said main link being provided with a cross-bar to which the other end of the strap is secured, substantially as shown and described.

2. In a device for fastening and tightening the straps of trunks and other articles, the combination with a main link provided with a cross-bar, and with a cross-head which is secured to or formed on one end thereof, adjacent to said cross-bar, and which projects therefrom, of a supplemental link which is wider than the main link and which is provided with projecting arms which are pivoted to said cross-head, said supplemental link being provided with a clamp, which comprises a cross-head, having projecting arms which are connected with and adapted to swing on the cross-rod of the supplemental link adjacent to said arms of the supplemental link, said cross-head of the clamp being provided with upwardly-directed shoulders to which is pivoted a clamping plate or lever, the free edge of which is adapted to rest on the arms of the cross-head of the clamp, and which is provided on its under side with a downwardly-directed flange, between which and the cross-head of the clamp the free end of the strap is passed, and the ends of the sides of the main link opposite the cross-head which is formed thereon or secured thereto being provided with notches or recesses in their upper sides adapted to receive the outer cross-rod of the supplemental link, and the end of the main link adjacent to said notches or recesses being above the plane of the body thereof, substantially as shown and described.

3. In a fastening device for the straps of trunks and other articles, the combination with a main link as 5, provided with a downwardly and outwardly extending shank as 6, and a cross-head as 7, formed thereon, said main link being also provided with a cross-bar 8, adjacent to said shank, and with notches or recesses as 24, in the sides thereof, and with a raised end or cross-rod as 26, of a supplemental link as 10, which is provided at one end with arms as 11, which are bent downwardly and pivotally connected with shoulders formed on the cross-head 7, said supplemental link being also provided with a clamp 15, which is pivoted to the inner cross-rod 13, of the supplemental link, said clamp consisting of a cross-head, and with a pivoted clamping plate or lever as 20; and said supplemental link being adapted to be folded over the main link and to be secured in position, substantially as shown and described.

In testimony that I claim the foregoing as my invention I have signed my name, in presence of the subscribing witnesses, this 10th day of October, 1896.

WILLIAM J. DAVIS.

Witnesses:
CHARLES S. ROGERS,
A. L. PICKARD.